(12) United States Patent
Yohpe et al.

(10) Patent No.: US 6,438,506 B1
(45) Date of Patent: Aug. 20, 2002

(54) APPARATUS AND METHOD FOR DETERMINING GROUND SPEED OF A WORK VEHICLE

(75) Inventors: Kevin C. Yohpe, Bolingbrook; Edmund N. Holt, II, Naperville; James Thannikary, Aurora, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/408,883

(22) Filed: Sep. 29, 1999

(51) Int. Cl.$^7$ ................................................ G01P 3/00
(52) U.S. Cl. ........................................ 702/145; 701/56
(58) Field of Search ............................. 702/145, 147, 702/148, 158, 142, 141; 701/50, 55, 51, 62, 82, 56

(56) References Cited

U.S. PATENT DOCUMENTS 5,611,245 A * 3/1997 McKee ..................... 74/336 R
5,845,224 A * 12/1998 McKee ........................ 701/51
5,911,769 A * 6/1999 Orbach et al. .............. 701/50
5,916,291 A * 6/1999 McKee ........................ 701/55

* cited by examiner

*Primary Examiner*—Marc S. Hoff
*Assistant Examiner*—Mohamed Charioui
(74) *Attorney, Agent, or Firm*—A. N. Trausch (57) ABSTRACT

An apparatus and method wherein at least two different sensors are used to obtain information related to ground speed of a work vehicle, and a control unit determines the ground speed based upon certain of the information from the sensors while the work vehicle is operating in a first ground speed range and based upon certain other information provided by the sensors while the work vehicle is operating in a second ground speed range. A display unit can advantageously be provided for displaying the ground speed determined by the control unit to the vehicle operator. The ground speed thus determined can also be used to more accurately control vehicle functions that depend on the ground speed. The ground speed can be selected from one or a combination of indications including a ground speed radar, a transmission or wheel speed pickup sensor, or a synthesized ground speed determined using engine speed and the commanded transmission gear ratio.

27 Claims, 5 Drawing Sheets

APPARATUS AND METHOD FOR DETERMINING GROUND SPEED OF A WORK VEHICLE

FIELD OF THE INVENTION

The present invention relates to an apparatus and a method for more accurately determining ground speed of a work vehicle. In particular, the present invention relates to an apparatus and a method wherein at least two different sensors are used to obtain information related to ground speed of a work vehicle, and a control unit determines the ground speed based upon certain of the information from the sensors while the work vehicle is operating in a first ground speed range and based upon certain other information provided by the sensors while the work vehicle is operating in a second ground speed range. A display unit can advantageously be provided for displaying the ground speed determined by the control unit to the vehicle operator. The ground speed thus determined can also be used to more accurately control vehicle functions that depend on the ground speed.

BACKGROUND OF THE INVENTION

In many work vehicles, such as agricultural vehicles (e.g., tractors), it is desirable to obtain an accurate indication of vehicle ground speed (i.e., the speed of the vehicle with respect to the ground upon which the vehicle travels). The ground speed can be displayed to the vehicle operator, or can be used to control vehicle functions that depend upon ground speed (e.g., by providing control signals for a planting implement coupled to an agricultural tractor). Vehicle ground speed may be measured in several ways. For example, vehicle ground speed may be determined by use of a ground speed radar, if the vehicle is so equipped, which calculates the ground speed by measuring the time elapsed between the emission of radar pulses and the reception of reflections from terrain in front of the vehicle. Alternatively, where the vehicle is not equipped with a ground speed radar, ground speed may be determined by measuring the rotational velocity of a wheel of the work vehicle or a related quantity, such as the rotational velocity of a transmission output shaft. Ground speed may also be estimated by measuring the engine speed, and taking into account the transmission gear ratio and master clutch engagement.

In conventional work vehicles, such as in conventional agricultural tractors, ground speed is measured using a ground speed radar where the tractor is equipped with such a radar. When, however, the tractor is not equipped with a ground speed radar, ground speed is typically measured using a rotational velocity sensor coupled to one of the wheels, or to a transmission gear or transmission shaft.

Each of the above-described devices for measuring vehicle ground speed is limited in certain respects. For example, measuring ground speed using a ground speed radar is more or less accurate depending upon the terrain on which the vehicle is traveling (i.e., depending on whether the radar receives coherent reflections), and also depending upon the ground speed itself. Specifically, in the example of an agricultural tractor operable in both fields (at relatively low working speeds generally below about 8 miles per hour (mph)) or paved roads (at relatively high transport speeds generally above 10 mph), ground speed measurements obtained using a radar are often relatively accurate where the tractor is traveling in a field (e.g., at mid-range velocities of between about 2 and 8 miles per hour). However, the ground speed radar measurements are often relatively inaccurate when the tractor is traveling on roads (e.g., at higher velocities of above 10 miles per hour), especially on wet pavement, and ground speed measurements also tend to be relatively inaccurate at very low velocities (e.g., of below 2 miles per hour).

Measuring vehicle ground speed by sensing wheel velocity or engine speed (or some related quantity) becomes more or less accurate based upon whether the wheels of the vehicle are experiencing slippage with respect to the ground. Slippage may occur due to, for example, travel on wet surfaces (e.g., paved roads) or due to the normal slippage that occurs as a work vehicle such as an agricultural tractor works in a field. Determinations of ground speed based upon measurements of wheel velocity may also become less accurate than estimations of ground speed based upon engine speed at very low velocities (e.g., below 0.5 miles per hour) due to inaccuracies in the sensing of wheel velocity (or the sensing of related quantities).

Since each of the above-described devices for measuring vehicle ground speed is relatively inaccurate under particular conditions, conventional work vehicles equipped with only one type of ground speed measuring device suffer from not being able to accurately measure ground speed under the variety of conditions typically faced during operations of such vehicles. For example, in agricultural tractors equipped with ground speed radars, the measured ground speed tends to be relatively accurate when the tractors are traveling in fields at mid-range velocities, but tends to be relatively inaccurate both when traveling at relatively high transport speeds on paved roads, and also at very low velocities. Meanwhile, in agricultural tractors not equipped with ground speed radars, measured ground speeds tend to be relatively inaccurate under the high slippage conditions (i.e., working a field) which prevail under the conditions within which those tractors were designed to operate.

Accordingly, it would be desirable to develop a system for determining a more accurate indication of vehicle ground speed under a variety of operating conditions than is currently available with conventional work vehicles. Also, it would be desirable to develop a system that is capable of obtaining this more accurate indication of vehicle ground speed through the implementation of one or more conventional sensing devices, including a ground speed radar, a wheel velocity (or transmission output shaft velocity) sensor, and/or an engine speed sensor. Further, it would be desirable to develop such a system that is applicable for use on work vehicles, which are typically operated on a wide variety of terrains over a wide range of ground speeds and under a wide variety of slippage conditions, including under different loads. It would be desirable to provide a more accurate display of ground speed to the vehicle operator, and would also be desirable to more accurately control vehicle functions that depend upon the ground speed.

SUMMARY OF THE INVENTION

One embodiment of the present invention relates to an apparatus for determining ground speed of a work vehicle. The apparatus includes a first sensor for producing a first signal representative of a first quantity representative of the ground speed of the work vehicle, a second sensor for producing a second signal representative of a second quantity representative of the ground speed, and a control unit coupled to the sensors. The control unit receives the first and second signals, determines a first indication of the ground speed of the work vehicle if at least one of the first and the second signals indicates that the ground speed is greater than a first level, and determines a second indication of the ground speed if the at least one of the first and the second signals indicates that the ground speed is less than a second level, with the second level being less than or equal to the first level.

Another embodiment of the present invention relates to an apparatus for determining the ground speed of a tractor. The apparatus includes a transmission pickup sensor configured to produce a transmission speed signal, a ground speed radar configured to produce a ground speed radar signal, a control unit coupled to the transmission pickup sensor and the ground speed radar, and a display unit coupled to the control unit. The control unit is configured to receive the transmission speed and ground speed radar signals and to produce a display control signal indicative of the ground speed. The display control signal is based solely upon the transmission speed signal if the control unit determines based upon the transmission speed signal that the ground speed is greater than a first level. The display control signal is based solely upon the ground speed radar signal if the control unit determines based upon the transmission speed signal that the ground speed is less than a second level. The display unit is configured to display an indication of the ground speed of the tractor in response to the display control signal.

Another embodiment of the present invention relates to an apparatus for determining ground speed of a work vehicle. The apparatus includes first sensing means for sensing a first quantity related to the ground speed of the work vehicle and producing a first signal representative thereof, second sensing means for sensing a second quantity related to the ground speed and producing a second signal representative thereof and control means for receiving the first and second signals and for selecting at least one of the first and second signals as being indicative of the ground speed based upon an indication of the ground speed of the work vehicle.

Another embodiment of the present invention relates to a method of determining ground speed of a work vehicle. The method includes sensing a first quantity representative of the ground speed using a first sensor, sensing a second quantity representative of the ground speed using a second sensor, generating a first signal and a second signal in response to the sensing of the first and second quantities, respectively, and providing the first and second signals to a controller. The method also includes determining, at the controller, whether the ground speed of the work vehicle is above or below at least one predetermined level, and obtaining a third signal based upon at least one of the first and second signals, the third signal representing the ground speed of the vehicle. The obtaining of the third signal depends upon whether the ground speed of the work vehicle is determined to be above or below the at least one predetermined level.

BRIEF DESCRIPTION OF THE DRAWINGS

The exemplary embodiments will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
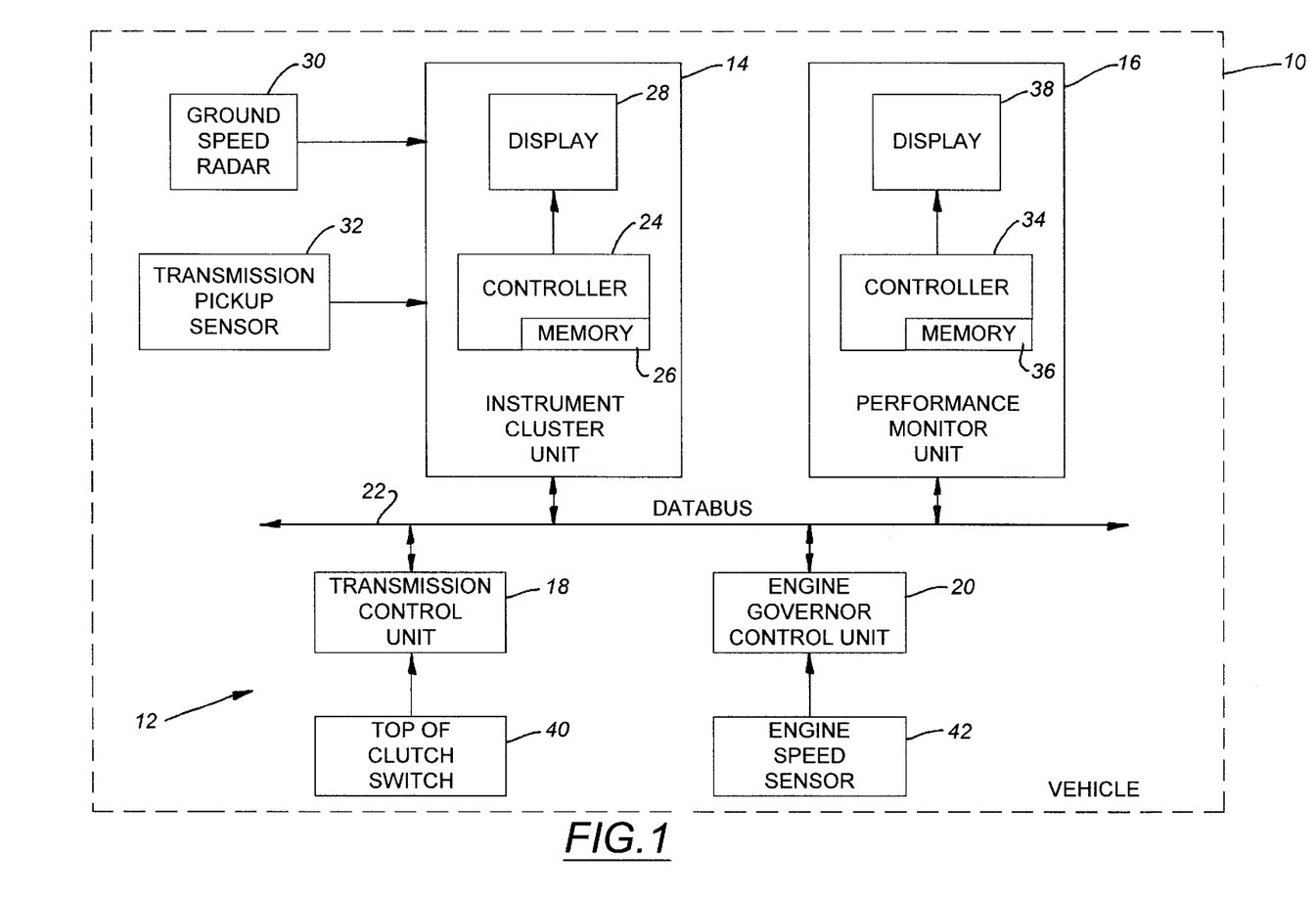
FIG. 1 is a block diagram showing an apparatus for determining ground speed of a work vehicle in accordance with one embodiment of the present invention, and including sensor, control, communications and display elements.

Referring to FIG. 1, an apparatus for more accurately determining vehicle ground speed and displaying an indication of the ground speed to a vehicle operator is shown. Although the present system may be implemented in (and accordingly modified for use in) a wide variety of work vehicles including agricultural vehicles (e.g., tractors and combines) and construction vehicles, the preferred embodiment is especially configured for use in an agricultural tractor 10, such as an MX Magnum tractor available from Case Corporation of Wisconsin.

Tractor 10 is preferably configured with an electronic control system 12 including a number of electronic control units (ECUs), each of which controls a particular function of tractor 10, coupled for communication via a vehicle data bus. In particular, the ECUs of tractor 10 preferably include an instrument cluster unit (ICU) 14, a performance monitor unit (PMU) 16, a transmission control unit (TRCU) 18, an engine governor control unit (GOV) 20, and possibly other control units (not shown) for controlling other functions. ECUs 14, 16, 18 and 20 are preferably coupled together by a digital data bus 22 (e.g., a J-1939 serial data bus).

ICU 14, configured to control the instrument cluster located in the vehicle cab for displaying vehicle parameters to the operator, includes a controller 24 having a memory 26, and an electronic display 28 driven by controller 24. Controller 24 preferably includes a microprocessor for executing a predetermined control program stored in memory 26. ICU 14 receives sensed signals from a ground speed radar 30 and a transmission pickup sensor 32. Ground speed radar 30 and transmission pickup sensor 32 provide signals to ICU 14 that are related to vehicle ground speed. Specifically, ground speed radar 30 emits radar signals at the ground over which tractor 10 is traveling, receives reflections of these emitted radar signals, calculates vehicle ground speed based upon the time elapsed between the emission of the radar signals and reception of the reflected signals, and provides a signal indicative of vehicle ground speed to ICU 14. Transmission pickup sensor 32 measures the rotational velocity of the output shaft of a transmission of tractor 10 (not shown), and provides a signal indicative of the output shaft rotational velocity to ICU 14. In turn, ICU 14 calculates vehicle ground speed corresponding to the rotational velocity of the output shaft based upon the assumption that there is no slippage between the wheels of tractor 10 and the ground being traveled over.

In alternative embodiments, ground speed radar 30 and transmission pickup sensor 32 may provide other signals related to vehicle ground speed to ICU 14. For example, transmission pickup sensor 32 may include a calculation device for automatically calculating the vehicle ground speed corresponding to the measured rotational velocity of the transmission output shaft, such that the signal provided from sensor 32 to ICU 14 is already an indication of vehicle ground speed (rather than an indication of the rotational velocity of the transmission output shaft). Further, in alternate embodiments, other sensing devices may be used in place of ground speed radar 30 and transmission pickup sensor 32. For example, ground speed radar 30 may be replaced with an optical sensor, while transmission pickup sensor 32 may be replaced with a wheel velocity sensor for measuring the rotational velocity of one (or more) of the wheels of tractor 10 rather than the rotational velocity of the transmission output shaft (which is a proxy for wheel velocity).

ICU 14 is also coupled to data bus 22 for communication with the other ECUs including PMU 16, TRCU 18 and GOV 20. Each of the other ECUs also preferably includes a microprocessor configured to execute a predetermined control program stored in local memory to control a particular function of the work vehicle using appropriate input and output interfaces. PMU 16, an optional ECU which displays additional performance parameters to the vehicle operator, includes a controller 34 having a memory 36, and an electronic display 38 driven by controller 34. TRCU 18, which controls the vehicle transmission, receives a signal generated by a top-of-clutch switch 40, and provides a clutch engagement signal to ICU 14 via data bus 22. The clutch engagement signal indicates whether the transmission's master clutch (not shown) is engaged such that rotational power from the engine is being transmitted to the wheels of the vehicle. TRCU 18 also provides the commanded gear ratio for the transmission to ICU 14 via data bus 22. GOV 20 receives an input signal from an engine speed sensor 42 configured to measure the rotational velocity of the vehicle engine (not shown), and provides an engine speed signal indicative of the engine rotational velocity to ICU 14 via data bus 22.

The information contained within the clutch engagement signal, the transmission gear ratio command and the engine speed signal provided to ICU 14 is used by ICU 14 to calculate a synthesized vehicle ground speed. As with the vehicle ground speed determined using the signal from transmission pickup sensor 32, the calculation of synthesized vehicle ground speed presumes that no slippage of the wheels of tractor 10 is occurring with respect to ground. Information regarding the transmission gear ratio command is necessary for calculating the synthesized vehicle ground speed since the commanded gear ratio determines the ratio between the rotational velocities of the engine output shaft and the wheels of tractor 10. Information from the clutch engagement signal is necessary for calculating the synthesized vehicle ground speed since torque is transmitted from the engine to the wheels of tractor 10 only when the master clutch is engaged. In one embodiment, if the top-of-clutch switch is not engaged, then the vehicle is not transmitting power from the engine to the wheels (i.e., speed=0).

ICU 14 is thus provided with or calculates three different indications of vehicle ground speed. That is, ICU 14 receives a first indication of vehicle ground speed from ground speed radar 30, calculates a second indication of vehicle ground speed based upon the signal from transmission pickup sensor 32, and calculates a third indication of vehicle ground speed by synthesizing vehicle ground speed using the three signals provided by TRCU 18 and GOV 20 discussed above. Upon receiving these three different indications of vehicle ground speed, controller 24 of ICU 14 determines (i.e., selects) which one of (or combination of) the three indications is the most accurate indication of vehicle ground speed. This selected vehicle ground speed is then used to provide a display control signal to display 28, therein causing a display of vehicle ground speed information to the operator. In other embodiments, ICU 14 communicates the vehicle ground speed to other ECUs on data bus 22 for use by control algorithms used to control other vehicle functions.

In alternate embodiments, it may be desirable that vehicle ground speed be displayed on a different display than that of ICU 14, such as on display 38 of PMU 16. This could occur where display 38 is more conveniently viewed by the operator. Thus, in an alternate embodiment, the three indications of vehicle ground speed are communicated from ICU 14 to PMU 16 via bus 22 (or by an independent communication link). PMU 16 then determines the most accurate indication of vehicle ground speed and causes the selected value to be displayed on display 16. In yet another embodiment, ICU 14 determines the most accurate vehicle ground speed indication and simply communicates that indication to PMU 16 for display.

Figure 2:
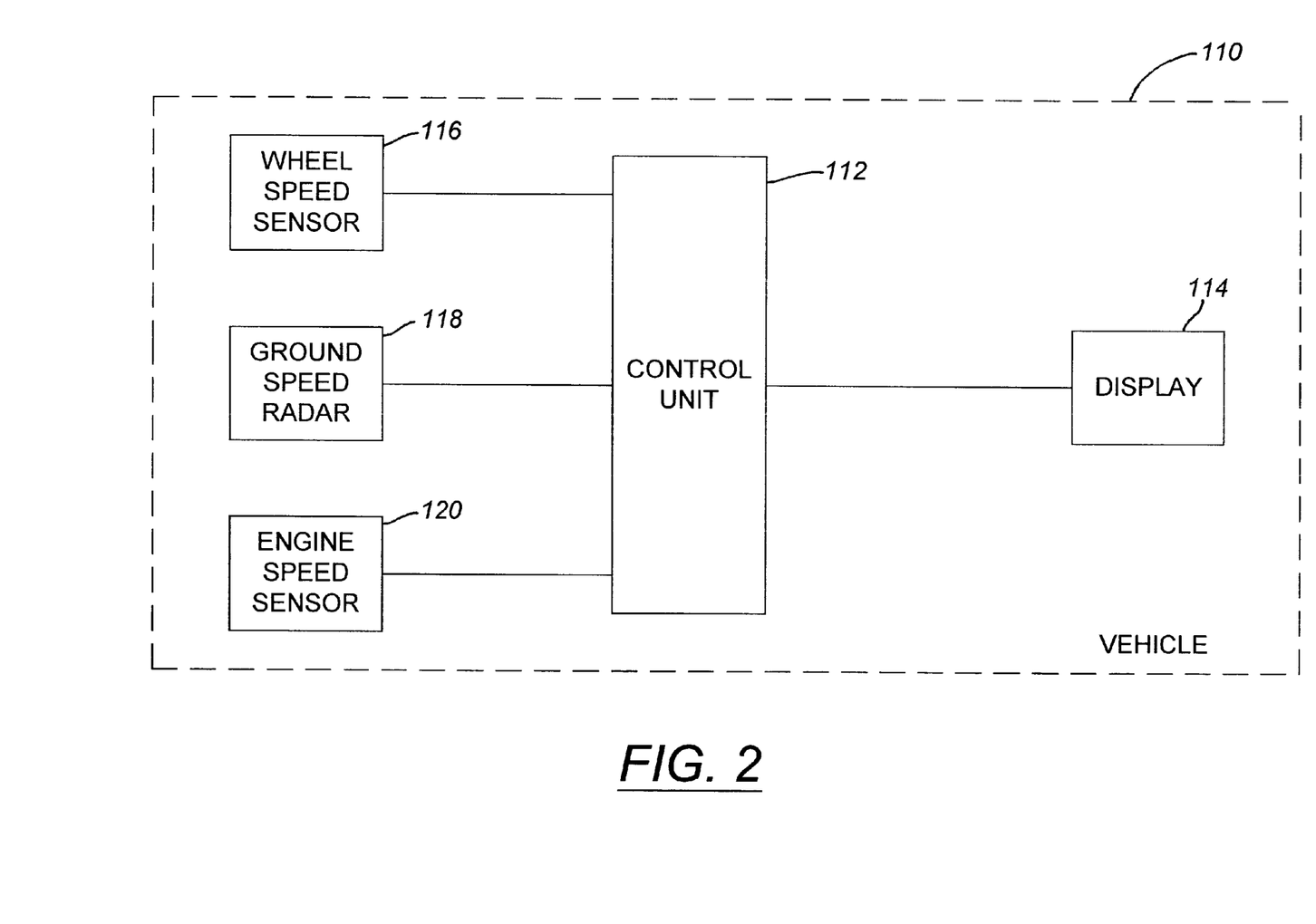
FIG. 2 is a block diagram showing another apparatus for determining ground speed of a work vehicle in accordance with a second embodiment of the invention, and including sensor, control, communications and display elements.

Referring to FIG. 2, an alternate embodiment is shown in a vehicle 110 that includes a control unit 112 coupled to and configured to drive a display 114 and further coupled to a wheel speed sensor 116, a ground speed radar 118 and an engine speed sensor 120. In this embodiment, control unit 112 operates in the same manner as controller 24 of ICU 14 except insofar as control unit 112 does not receive any information from other control units via a data bus such as bus 22. Information regarding the commanded transmission gear ratio and clutch engagement is not shown as being provided to control unit 112 since, in this embodiment, it is presumed that the clutch is engaged and that the transmission gear ratio remains fixed or can be deduced from other information, such as wheel velocity. Of course, control unit 112 could easily obtain such information directly from appropriate sensors. In other embodiments, information from only two of the three sensors shown (i.e., wheel speed sensor 116, ground speed radar 118 and engine speed sensor 120) or other sensors may be provided to control unit 112.

Figure 3:
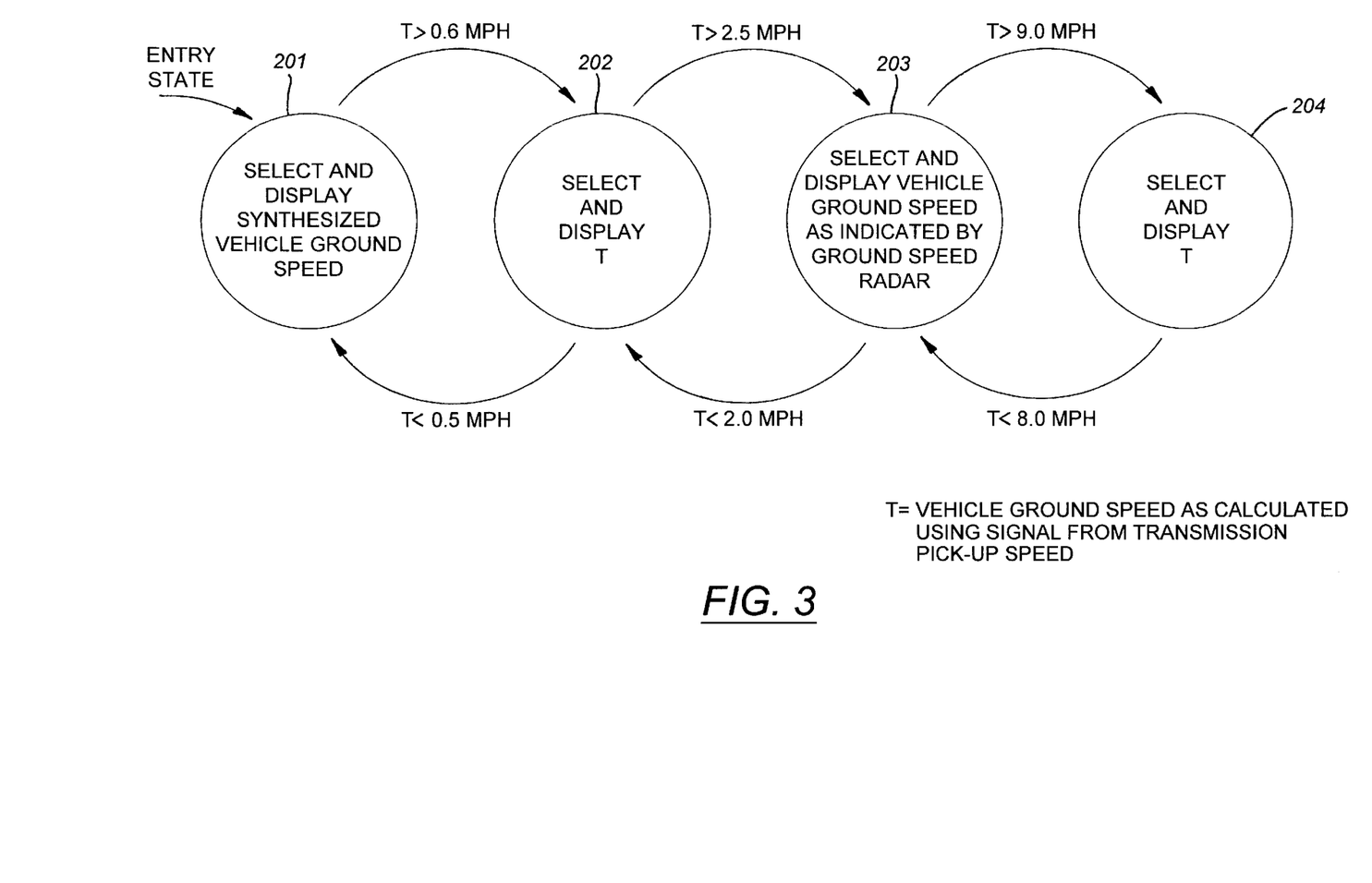
FIG. 3 is a state diagram showing exemplary states of operation of the control element of the apparatus shown in either FIG. 1 or FIG. 2.

As shown in FIG. 3, ICU 14 determines the most accurate indication of vehicle ground speed for output on display 28, and/or for use in controlling a vehicle function, according to the disclosed state diagram. ICU 14 continually obtains or calculates the three indications of vehicle ground speed described above, namely, vehicle ground speed based upon the signals from ground speed radar 30, from transmission pickup sensor 32, or from TRCU 18 and GOV 20 (i.e., synthesized vehicle ground speed). ICU 14 continually monitors vehicle ground speed using the signal from transmission pickup sensor 32. Upon commencing operation, ICU 14 enters state 201 and selects the synthesized vehicle ground speed as the most accurate indication of ground speed and displays that indication on display 28 by sending a control signal from controller 24 to display 28. However, if the vehicle ground speed indicated by transmission pickup sensor 32 exceeds 0.6 miles per hour (mph), ICU 14 switches to state 202. In state 202, ICU 14 selects the vehicle ground speed indication based upon transmission pickup sensor 32 as the most accurate indication of vehicle ground speed and displays that indication.

If vehicle ground speed then drops below 0.5 mph as indicated based upon transmission pickup sensor 32, ICU 14 returns to state 201 and reselects and displays the synthesized vehicle ground speed. ICU 14 will then remain in state 201 as long as the ground speed indicated by transmission pickup sensor 32 is below 0.6 mph. The difference between the 0.6 and 0.5 mph values thus represents hysteresis to prevent the system from continually switching between states 201 and 202 at indicated ground speeds between these ground speed values. However, if vehicle ground speed instead exceeds 2.5 mph (as indicated by transmission pickup sensor 32) in state 202, ICU 14 switches to state 203, wherein ICU 14 selects and displays vehicle ground speed based upon ground speed radar 30 being the most accurate indication of vehicle ground speed. If vehicle ground speed then drops below 2.0 mph (as indicated by transmission pickup sensor 32), ICU 14 then returns to state 202 and reselects (and displays) vehicle ground speed based upon transmission pickup sensor 32. If vehicle ground speed remains equal to or above 2.0 mph but below 9.0 miles per hour , ICU 14 remains in state 203 and continues to select (and display) vehicle ground speed based upon ground speed radar 30. However, if vehicle ground speed instead exceeds 9.0 mph, ICU 14 switches to state 204, in which ICU 14 selects and displays vehicle ground speed based upon transmission pickup sensor 32. ICU 14 then remains in state 204 until ground speed falls below 8.0 mph (as indicated by transmission pickup sensor 32), in which case ICU 14 will again enter state 203. Thus, ICU 14 will be active in one of states 201, 202, 203 and 204, with the ground speed indicated by one of the sources of ground speed (i.e., transmission pickup sensor 32) used to transition between the states, and with appropriate hysteresis used to prevent continuous switching between adjacent states at indicated ground speeds near the boundaries between the states.

States 201–204 of ICU 14 are designed so that ICU 14 selects and displays the most accurate indication of the actual ground speed of tractor 10 that is possible given the three indications of vehicle ground speed available to ICU 14. As discussed above, the indication of vehicle ground speed based upon the signal from ground speed radar 30 is the most accurate indication of ground speed at mid-range speeds in the range of 2.0 to 8.0 mph. Therefore, ICU 14 is in state 203 when the vehicle ground speed is within approximately that range. The signal from ground speed radar 30 is no longer the most accurate basis for determining vehicle ground speed when the velocity of tractor 10 exceeds that level, however, since a higher ground speed (e.g., above 10.0 mph) tends to indicate travel on a paved road, which limits the accuracy of ground speed radar 30. At these higher speeds, the signal from transmission pickup sensor 32 is the most accurate indication of the actual ground speed of tractor 10, and so ICU 14 is designed to enter state 204.

Further, as discussed above, the signal from ground speed radar 30 also may not be the most accurate basis for determining the ground speed of tractor 10 when vehicle velocity falls below 2.0 mph. Thus, ICU 14 is designed to switch from state 203 to state 202 if vehicle ground speed indicated by transmission pickup sensor 30 falls below 2.0 mph. Additionally, the signal from transmission pickup sensor 32 becomes inaccurate as an indication of ground speed when the actual speed of tractor 10 falls to very low speeds (i.e., below 0.5 mph), and so at such very low speeds ICU 14 switches to state 201.

Vehicle ground speed as determined based upon the signal from transmission pickup sensor 32 is used by ICU 14 as the basis for changing states because the vehicle velocity indication provided by the transmission pickup sensor is relatively accurate at each of the state transition points. That is, while ground speed radar 30 provides a less accurate indication of ground speed at low velocities (e.g., below 2.0 mph) and the synthesized vehicle velocity is less accurate at higher speeds (e.g., 8.0 mph), the vehicle velocity indication provided from transmission pickup sensor 32 is relatively accurate at each of these velocities. Nevertheless, in alternate embodiments, ICU 14 could utilize the vehicle velocity indication provided by ground speed radar 30, the synthesized vehicle velocity, or some other indication (or some combination thereof) as the basis for changing between states. For example, ICU 14 could use the vehicle velocity indication from transmission pickup sensor 32 to determine state transitions at low speeds, but utilize velocity indication from ground speed radar 30 to determine transitions between states at high speeds.

As shown in FIG. 3, the operation of ICU 14 may include hysteresis functionality (which may be made possible through the implementation of a memory device, such as memory 26). Specifically, while ICU 14 switches from one state (e.g., state 201) to a second state (e.g., state 202) when the vehicle ground speed is indicated to exceed a first level (e.g., 0.6 mph), ICU 14 does not return to the first state from the second state until such time as the ground speed is indicated to fall below a second, lower level (e.g., 0.5 mph). That is, the transitioning points between the different states depend upon whether vehicle velocity is increasing or decreasing. Consequently, when vehicle velocity increases above a first level that would precipitate a change of the state of ICU 14, the mere fact that the vehicle velocity soon thereafter falls below that first level does not cause the instrument cluster unit to immediately return to the first state.

Such hysteresis (or other state transitioning functionality as described below) is necessary because, at certain times, the actual velocity of tractor 10 may remain near (and repeatedly oscillate about) a state transition point and because the vehicle velocity indications obtained by ICU 14 may differ from one another at any given velocity of the tractor. That is, without hysteresis the vehicle ground speed displayed on display 28, or used for control, may repeatedly jump between two different levels as ICU 14 switches between different vehicle velocity indications. For example, the ground speed of tractor 10 may remain at approximately 8 miles per hour for an extended period of time. Due to inaccuracies in the operation of ground speed radar 30, the indication of vehicle ground speed provided to ICU 14 from ground speed radar 30 in this case may be 8.1 mph, while the vehicle velocity indication based upon transmission pickup sensor 32 may be 8.0 mph. Consequently, in a case where ICU 30 is configured to switch between displaying the ground speed indications based upon the signals from ground speed radar 30 and transmission pickup sensor 32 at 8.0 mph (as indicated by the transmission pickup sensor), without hysteresis, the ground speed displayed on display 28 would likely toggle back and forth between two levels (e.g., between 8.0 and 8.1 mph) as the actual ground speed repeatedly slightly exceeded and then fell below 8.0 mph.

Figure 4:
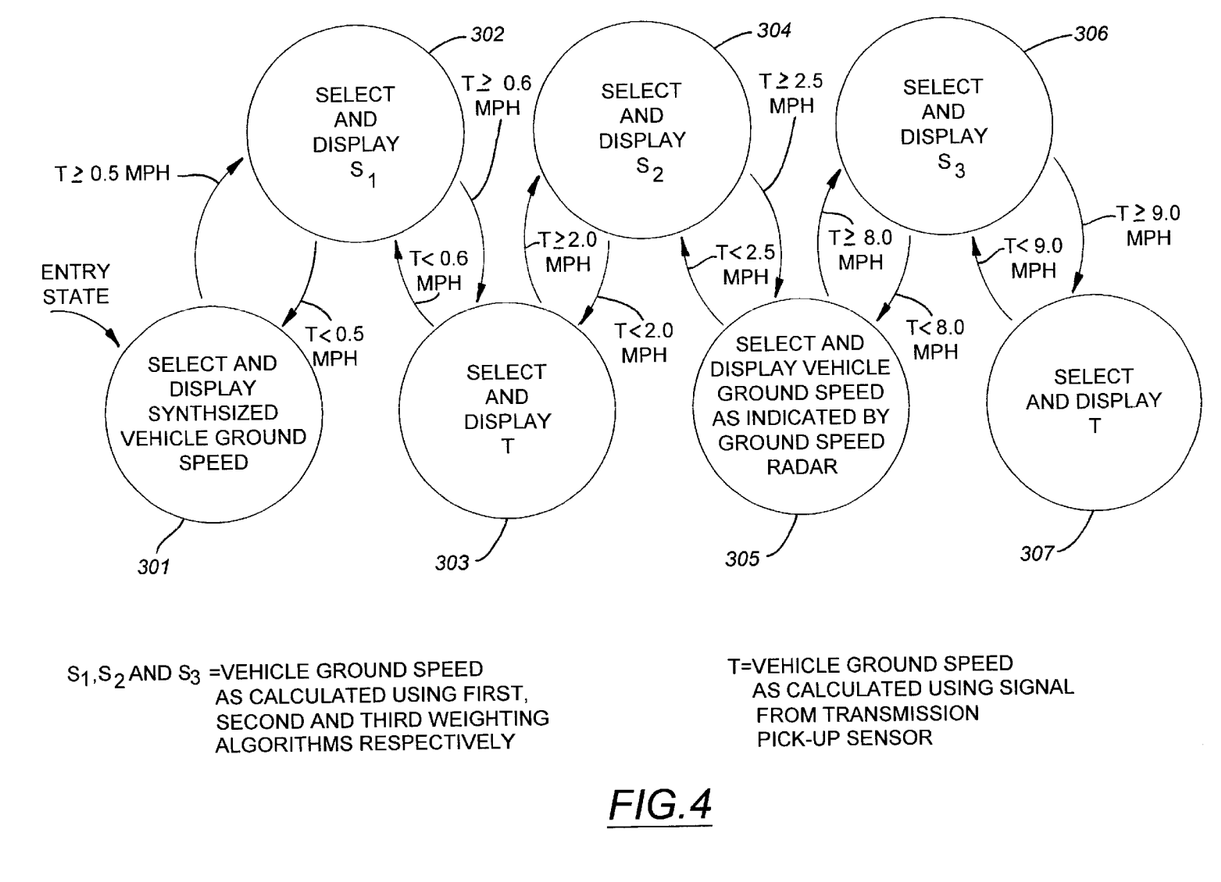
FIG. 4 is a state diagram showing the preferred states of operation of the control element of the apparatus shown in either FIG. 1 or FIG. 2.

A variety of different types of state transitioning functionality are possible in place of the hysteresis of FIG. 3, to mitigate jumpiness in the selected ground speed. A preferred embodiment of state transitioning functionality of ICU 14 is shown in FIG. 4. In this embodiment, ICU 14 operates in one of seven states 301–307. Upon starting operation, tractor 10 enters state 301, wherein ICU 14 selects synthesized ground speed as the most accurate indication of actual vehicle velocity, and causes the synthesized ground speed to be displayed on display 28. Further with respect to states 303, 305 and 307, ICU 14 selects and displays the ground speed indications based upon the signals from transmission pickup sensor 32, ground speed radar 30 and again the transmission pickup sensor, respectively. ICU 14 enters states 303, 305 and 307 when transmission pickup sensor 32 indicates that ground speed has, respectively, become greater than or equal to 0.6 mph and less than 2.0 mph, greater than or equal to 2.5 mph and less than 8.0 mph, and greater than or equal to 9.0 mph.

In contrast to FIG. 3, the state transitioning functionality of FIG. 4 does not include hysteresis per se to mitigate any differences between the three ground speed indications by having state transition points that differ depending upon whether vehicle velocity is increasing or decreasing. Rather, ICU 14 mitigates any differences in the three ground speed indications by operating in additional states 302, 304 and 306 when the velocity as indicated by transmission pickup sensor 32 has become greater than or equal to 0.5 mph and less than 0.6 mph, greater than or equal to 2.0 mph and less than 2.5 mph, and greater than or equal to 8.0 mph and less than 9.0 mph, respectively.

Operation of ICU 14 in states 302, 304 and 306 mitigates any differences between the ground speed indications provided by the different sensors by smoothing out any such differences. In each of these states, ICU 14 determines the most accurate indication of vehicle velocity to be a weighted sum of two of the three ground speed indications. Specifically in state 302, ICU 14 determines the most accurate ground speed indication as being a weighted sum of the synthesized vehicle velocity and the velocity indication provided by transmission pickup sensor 32. The weighting applied to each of the two component velocity indications varies linearly with how close the velocity is (as indicated by transmission pickup sensor 32) with respect to the transition points of state 302 (i.e., 0.5 mph and 0.6 mph).

For example, if the vehicle ground speed as indicated based upon transmission pickup sensor 32 is 0.53 mph, and the ground speed as indicated by the synthesized vehicle velocity is 0.63 mph, the displayed vehicle ground speed is:

$$[0.63*(0.6-0.53)/(0.6-0.5)]+[(0.53*(0.53-0.5)/(0.6-0.5)]=0.60 \text{ mph} \quad (1)$$

Similarly, in states 304 and 306, ICU 14 determines the most accurate vehicle velocity indication as being a weighted sum of the ground speed indications based upon the signals from transmission pickup sensor 32 and ground speed radar 30. The weightings applied to the two component velocity indications varies linearly with how close the vehicle velocity is (as indicated from transmission pickup sensor 32) with respect to the transition points of state 304 and state 306 (i.e., 2.0 and 2.5 mph, and 8.0 and 9.0 mph, respectively). In alternate embodiments, a variety of other algorithms (i.e., having nonlinear weighting) or hysteresis functionality may be utilized to mitigate any differences between the vehicle velocity indications provided by the different sensors that may exist near state transition points.

Figure 5:
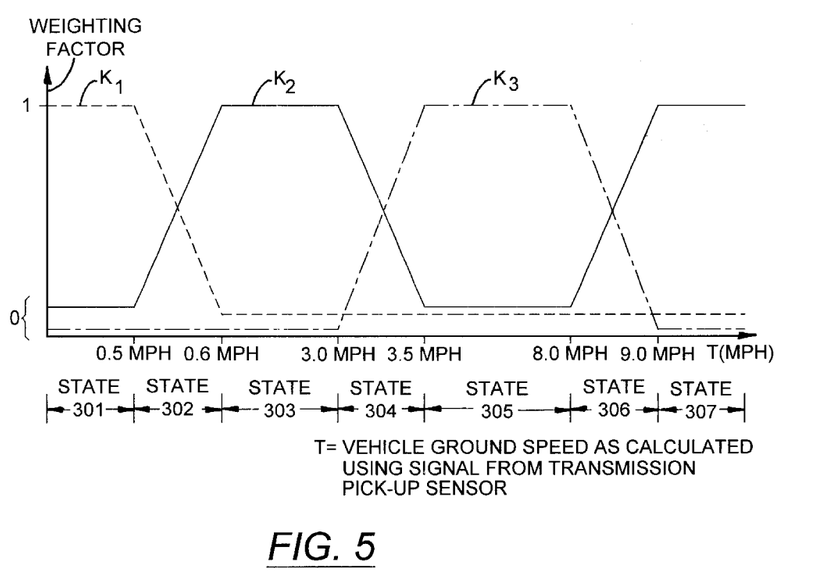
FIG. 5 is a graph showing the variations of weighting constants as a function of vehicle ground speed, the weighting constants being used by the control element of the apparatus of FIG. 1 or FIG. 2 in determining vehicle ground speed based on a weighted combination of three indications of vehicle ground speed.

Referring to FIG. 5, the overall operation of ICU 14 in the preferred embodiment to determine the most accurate indication of vehicle ground speed (which is displayed on display 28) may be viewed as a weighted summing of all three indications of vehicle ground speed that are provided to ICU 14. That is, ICU 14 calculates the vehicle ground speed that is to be displayed (V) as a weighted sum of the synthesized ground speed (S), the ground speed based upon the signal from transmission pickup sensor 32 (T), and the ground speed as indicated by ground speed radar 30 (R), respectively weighted by constants $k_1$, $k_2$ and $k_3$:

$$V = k_1 S + k_2 T + k_3 R \quad (2)$$

FIG. 5 in particular shows how the respective weighting constants $k_1$, $k_2$ and $k_3$ vary with ground speed (as indicated by the signal from transmission pickup sensor 32) and with the corresponding states of operation of ICU 14 (i.e., states 301–307). As shown, at vehicle velocities corresponding to states 301, 303, 305 and 307, only one of weighting constants $k_1$, $k_2$ and $k_3$ has a nonzero value of one; in each of these states, ICU 14 effectively determines ground speed based upon only one of the three ground speed indications that are provided. Also, at ground speeds corresponding to states 302, 304 and 306, two of the three weighting constants have nonzero values, which linearly vary with ground speed between zero and one; in each of these states, ICU 14 determines vehicle ground speed as a combination of two of the vehicle velocity indications provided.

As discussed, the transitioning of ICU 14 from one state to another in the preferred embodiment is based exclusively upon the signal from transmission pickup sensor 32. It is possible that, in certain circumstances, transmission pickup sensor 32 may provide spurious (or otherwise inaccurate) indications of ground speed for very short periods of time. If such inaccurate vehicle velocity indications are taken to be accurate by ICU 14, the instrument cluster unit may switch between states of operation even though such switching is not appropriate (since the actual velocity has not yet changed sufficiently to require a change in state). Therefore, in the preferred embodiment, ICU 14 is configured to verify the accuracy of the signal from transmission pickup sensor 32 before switching between states of operation.

Figure 6:
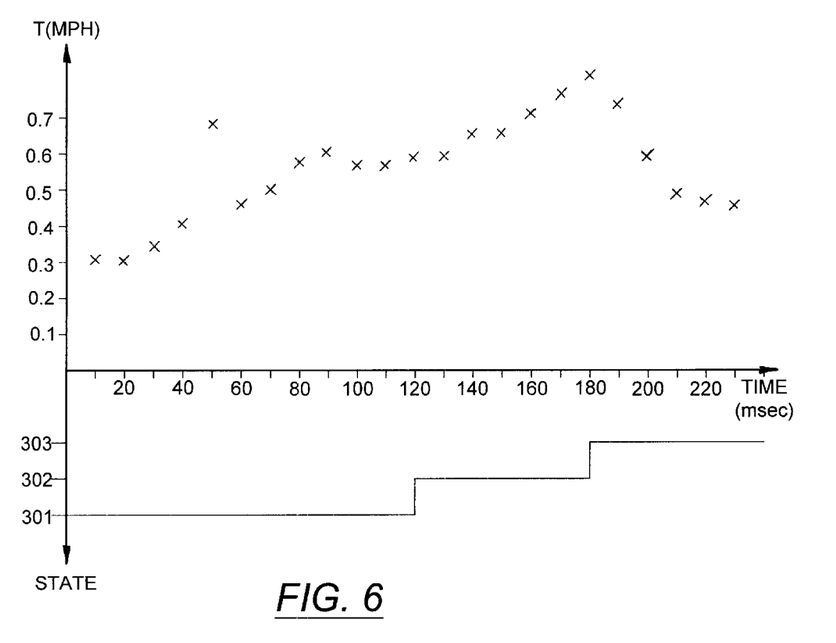
FIG. 6 is an exemplary graph illustrating how the control element of the apparatus of FIG. 1 or FIG. 2 changes states in response to variation in sampled vehicle ground speed.

Referring to FIG. 6, ICU 14 monitors the signal from transmission pickup sensor 32 by repetitively sampling the signal every 10 msec. When the signal from transmission pickup sensor 32 first indicates that the vehicle velocity has changed sufficiently that ICU 14 should change its state (e.g., indicates the vehicle velocity has increased from being below 0.5 mph to above 0.5 mph), ICU 14 does not immediately change its state. For example, as shown in FIG. 6, ICU 14 does not change from state 301 to state 302 merely because transmission pickup sensor 32 indicates at one sampling (e.g., at 50 msec on the horizontal axis) that vehicle velocity has jumped from 0.4 mph to 0.65 mph. Rather, ICU 14 continues to monitor the vehicle velocity and only changes its state after the signal from transmission pickup sensor 32 has indicated, in five successive samples, that the vehicle velocity indeed has passed the state transition point. For example, as shown, ICU 14 changes from state 301 to state 302 following five successive readings that vehicle velocity is above 0.5 mph and changes from state 302 to state 303 following five successive readings that vehicle velocity is above 0.6 mph. (ICU 14 may compare successive samples by recording the samples in memory 26.)

While ICU 14 operates in accordance with FIGS. 4–6 in the preferred embodiment, in alternate embodiments the operation of ICU 14 may have other characteristics. For example, the variation of weighting constants $k_1$, $k_2$ and $k_3$ in states 302, 304 and 306 may be nonlinear. Additionally for example, vehicle velocity may be based upon more than one of the three indications of vehicle velocity during operation in states 301, 303, 305 or 307. Further for example, ICU 14 may be configured to sample the signal from transmission pickup sensor 32 every 25 msec instead of every 10 msec, and to change its state only after the signal from transmission pickup sensor 32 has indicated, in two successive samples, that the vehicle velocity indeed has passed the state transition point. Additionally in alternate embodiments, ICU 14 may not wait to change state until a fixed number of samples of vehicle velocity indicate that such a change of state is appropriate.

While particular speed ranges and transition speed values have been described above and in the figures, it will be appreciated that these values may change depending on the particular application, and may depend on the limitations of the particular sensing systems used to provide the indications of vehicle ground speed. It will also be readily appreciated that the concepts of the invention described herein may be applied to work vehicles equipped with other types of alternative sensing systems for providing multiple indications of ground speed.

Although only a few exemplary embodiments have been described above, those skilled in the art will readily appreciate that many modifications are possible without materially departing from the novel teachings and advantages of this invention. As is readily indicated, the invention can be employed in a variety of vehicles in which it is necessary to provide an indication of vehicle ground speed to the operator, or to control vehicle functions. Further, the number and types of sensing elements, control elements, communication elements and output elements may vary insofar as they continue to accomplish functions related to determining an accurate indication of vehicle ground speed and providing that indication to the operator. Additionally, the functional operation of the control elements to more accurately determine the actual vehicle ground speed based upon more than one vehicle ground speed indication may vary from the embodiments shown herein. Accordingly, all such modifications are intended to be included within the scope of the invention as defined in the following claims. Other substitutions, modifications, changes and omissions may be made in the design, operating conditions and arrangement of preferred and alternative embodiments without departing from the spirit of the invention as expressed in the appended claims.

What is claimed is:

1. An apparatus for determining ground speed of a work vehicle, comprising:
    a first sensor configured to produce a first signal representative of a first quantity representative of the ground speed of the work vehicle;
    a second sensor configured to produce a second signal representative of a second quantity representative of the ground speed of the work vehicle; and
    a control unit coupled to the first sensor and the second sensor, the control unit configured to receive the first and second signals, wherein the control unit determines a first indication of the ground speed of the work vehicle if at least one of the first and the second signals indicates that the ground speed is greater than a first ground speed range, and determines a second indication of the ground speed if the at least one of the first and the second signals indicates that the ground speed is less than a second ground speed range, the second ground speed range being less than or equal to the first ground speed range.

2. The apparatus of claim 1, wherein the first signal is used to indicate to the control unit whether the ground speed is greater than the first ground speed range or is less than the second ground speed range.

3. The apparatus of claim 2, wherein the control unit selects the first signal as the first indication of the ground speed of the work vehicle, and the control unit selects the second signal as the second indication of the ground speed.

4. The apparatus of claim 3, wherein the first ground speed range is greater than the second ground speed range by a predetermined amount and, if the first signal indicates that the ground speed is less than the first ground speed range and greater than the second ground speed range, the control unit continues to select the first signal as being indicative of the ground speed if the first signal was last previously selected by the control unit, and continues to select the second signal as being indicative of the ground speed if the second signal was last previously selected by the control unit.

5. The apparatus of claim 3, wherein the first ground speed range is greater than the second ground speed range by a predetermined amount and, if the first signal indicates that the ground speed is less than the first ground speed range and greater than the second ground speed range, the control unit determines a third indication of the ground speed of the work vehicle based upon both the first signal and the second signal.

6. The apparatus of claim 5, wherein the control unit determines the third ground speed indication as a sum of a first weighting constant multiplied by the first signal and a second weighting constant multiplied by the second signal.

7. The apparatus of claim 1, wherein the control unit is further coupled to a data bus, which is coupled to at least one additional control unit.

8. The apparatus of claim 7, wherein the first sensor is a transmission pickup sensor, wherein the at least one additional control unit comprises a transmission control unit, and wherein the transmission pickup sensor is coupled to the transmission control unit.

9. The apparatus of claim 7, wherein the at least one additional control unit is an engine governor control unit, the engine governor control unit being coupled to an engine speed sensor which comprises the second sensor.

10. The apparatus of claim 9, further comprising a transmission control unit having a commanded gear ratio and coupled to a top of clutch switch for generating a clutch engagement signal, the commanded gear ratio and the clutch engagement signal being communicated to the control unit, wherein the control unit determines a synthesized ground speed based upon the commanded gear ratio, the clutch engagement signal, and an engine speed signal from the engine speed sensor.

11. The apparatus of claim 1, wherein the first sensor is configured to sense a quantity related to rotational speed of at least one wheel of the work vehicle, and the second sensor includes a ground speed radar.

12. The apparatus of claim 11, wherein the first sensor senses an output rotational velocity of a transmission of the work vehicle.

13. The apparatus of claim 11, wherein the first sensor senses a rotational velocity of a first wheel of the vehicle.

14. The apparatus of claim 1, wherein the control unit operates in any one of a plurality of states, and wherein the state of operation of the control unit at a given time depends upon the first signal.

15. The apparatus of claim 14, wherein the control unit repetitively samples the first signal, and the state of operation does not change until the control unit obtains a predetermined number of successive samples indicating that the ground speed has changed to an extent requiring the change in the state.

16. The apparatus of claim 1, further comprising a display unit coupled to the control unit and configured to display the ground speed of the work vehicle in response to a display control signal, wherein the control unit generates the display control signal based upon the one of the first and the second indications of the ground speed of the work vehicle that the control unit has determined.

17. The apparatus of claim 1, further comprising a third sensor configured to produce a third signal representative of a third quantity related to the ground speed of the work vehicle, wherein the control unit determines the first indication based solely upon the first signal if the first signal indicates that the ground speed is greater than the first ground speed range, and determines the second indication based solely upon the second signal if the first signal indicates that the ground speed is less than the second ground speed range and greater than a third ground speed range, and determines a third indication based solely upon the first signal if the first signal indicates to the control unit that the ground speed is less than a fourth ground speed range and greater than a fifth ground speed range, and determines a fourth indication based solely upon a synthesized velocity signal if the first signal indicates that the ground speed is less than a sixth ground speed range.

18. The apparatus of claim 1, wherein the control unit is an Instrument Cluster Unit.

19. The apparatus of claim 1, wherein the control unit is a Performance Monitor Unit.

20. The apparatus of claim 1, wherein the work vehicle is an agricultural tractor.

21. The apparatus of claim 1, wherein the work vehicle is a construction work vehicle.

22. An apparatus for determining the ground speed of a tractor, comprising:

a transmission pickup sensor configured to produce a transmission speed signal;

a ground speed radar configured to produce a ground speed radar signal;

a control unit coupled to the transmission pickup sensor and the ground speed radar, the control unit configured to receive the transmission speed and ground speed radar signals, the control unit configured to produce a display control signal indicative of the ground speed, wherein the display control signal is based solely upon the transmission speed signal if the control unit determines based upon the transmission speed signal that the ground speed is greater than a first ground speed range, and the display control signal is based solely upon the ground speed radar signal if the control unit determines based upon the transmission speed signal that the ground speed is less than a second ground speed range; and a display unit coupled to the control unit and configured to display an indication of the ground speed of the tractor in response to the display control signal.

23. The apparatus of claim 22, further comprising an engine speed sensor configured to produce an engine speed signal and coupled to the control unit, wherein the control unit determines a synthesized ground speed based upon a commanded transmission gear ratio, a clutch engagement signal, and the engine speed signal, and wherein the display control signal is based solely upon the synthesized ground speed if the control unit determines based upon the transmission speed signal that the ground speed is less than a third ground speed range.

24. An apparatus for determining ground speed of a work vehicle, comprising:

transmission pickup sensor for sensing a first quantity related to the ground speed of the work vehicle and producing a first signal representative thereof;

ground speed radar for sensing a second quantity related to the ground speed and producing a second signal representative thereof; and control means for receiving the first and second signals and for selecting at least one of the first and second signals as being indicative of the ground speed based upon an indication of the ground speed of the work vehicle.

25. The apparatus of claim 24, further comprising display means for displaying ground speed in response to a third signal received from the control means, the third signal related to the at least one of the first and second signals that was selected.

26. A method of determining ground speed of a work vehicle, the method comprising the steps of:

sensing a first quantity representative of the ground speed of the work vehicle using a transmission pickup sensor;

sensing a second quantity representative of the ground speed of the work vehicle using a ground speed radar;

generating a first signal and a second signal in response to the sensing of the first and second quantities, respectively;

providing the first and second signals to a controller;

determining, at the controller, whether the ground speed of the work vehicle is; above or below at least one predetermined ground speed range; and obtaining a third signal based upon at least one of the first and second signals, the third signal representing the ground speed of the vehicle, wherein the obtaining of the third signal depends upon whether the ground speed of the work vehicle is determined to be above or below the at least one predetermined ground speed range.

27. The method of claim 26, further comprising the steps of:

generating a display control signal based upon the third signal;

providing the display control signal to a display; and displaying the ground speed of the work vehicle on the display based upon the display control signal.

* * * * *